United States Patent [19]

Wolf et al.

[11] Patent Number: 5,563,785

[45] Date of Patent: Oct. 8, 1996

[54] METHOD OF PERFORMING DIAGNOSTICS ON AN ELECTRONICALLY CONTROLLED RAILWAY LOCOMOTIVE THROTTLE CONTROLLER

[75] Inventors: Daniel J. Wolf; Gregory S. Balukin, both of Pittsburgh, Pa.

[73] Assignee: Westinghouse Air Brake Company, Wilmerding, Pa.

[21] Appl. No.: 340,652

[22] Filed: Nov. 16, 1994

[51] Int. Cl.$^6$ .................................................. B61L 23/00
[52] U.S. Cl. ........................ 364/424.01; 364/579; 105/61
[58] Field of Search ..................................... 364/550, 152, 364/424.01, 551.01, 579, 424.05; 246/187 C, 167 R, 182 R; 105/61

[56] References Cited

U.S. PATENT DOCUMENTS

| | | |
|---|---|---|
| 3,715,579 | 2/1973 | Eblovi . |
| 3,794,834 | 2/1974 | Auer et al. . |
| 3,805,056 | 4/1974 | Birkin . |
| 4,344,364 | 8/1982 | Nickles et al. ........................ 105/62.1 |
| 4,656,586 | 4/1987 | Ochiai et al. ....................... 364/424.03 |
| 4,718,271 | 1/1988 | Garland ..................................... 73/116 |
| 5,016,840 | 5/1991 | Bezos . |
| 5,446,389 | 8/1995 | Lenz ........................................ 324/555 |

Primary Examiner—Ellis B. Ramirez
Assistant Examiner—M. Kemper
Attorney, Agent, or Firm—James Ray & Associates

[57] ABSTRACT

A method of diagnostic testing and taking appropriate corrective action on an electronically controlled throttle controller which includes scanning inputs from at least one of the throttle handles and a remote host. Communicating information from such throttle handles and/or remote host to a diagnostic testing device. Performing a check of such information fed to such diagnostic testing device to determine if the system is functioning properly and/or if corrective action is required. Taking appropriate corrective action if such corrective action is indicated. Calculating trainline outputs to be used when at least one of such appropriate corrective action is completed and/or it has been determined that such system is functioning properly. Communicating such trainline outputs calculated to such trainline. Communicating a feedback of such trainline outputs being communicated to a diagnostic testing device and reading such feedback of such trainline outputs. Performing a trainline output diagnostic check on such trainline outputs read to determine actual trainline output versus a commanded trainline output to determine that actual trainline output is correct and/or that an appropriate corrective action is required. Taking the appropriate corrective action indicated when it is determined that a corrective action is required and returning to the beginning when it is determined that such trainline output is correct.

20 Claims, 2 Drawing Sheets

METHOD OF PERFORMING DIAGNOSTICS ON AN ELECTRONICALLY CONTROLLED RAILWAY LOCOMOTIVE THROTTLE CONTROLLER

The invention taught in this patent application is closely related to the inventions taught in the following copending patent application Ser. Nos.: 08/340,525 Electronically Controlled Locomotive Throttle Controller Including Remote Multiple Unit Throttle Control; 08/340,651 Method And Apparatus For Determining And Encoding The Position Of A Reverser Handle On A Locomotive Control Stand; 08/340,235 Digital Output Control Device and Method For Operating; 08/340,239 Method And Apparatus For Feedback Of Trainline Status To The Central Processor Of A Locomotive Throttle Controller; 08/340,215 Apparatus For Interlocking Throttle, Dynamic Brake And Reverser Handles On A Control Stand Of A Railway Locomotive; 08/340,237 Method Of Operating A Locomotive Mounted Throttle Controller Between Two Modes Of Operation Including A Transition Between Such Two Modes; 08/340,742 An Apparatus For And A Method Of Generating An Analog Signal For Control Of Dynamic Braking; 08/340,232 An Apparatus For Feedback Of An Analog Signal Used To Monitor And/Or Control Dynamic Braking and Method of Operating; 08/340,213 An Apparatus To Enable Controlling A Throttle Controller From A Remote Host; 08/340,538 Apparatus For Interlocking Reverser Handle On A Control Stand Of A Railway Locomotive; and 08/340,526 Apparatus For Determining The Absolute Position Of Throttle, Dynamic Brake And Reverser Handles On A Locomotive Control Stand. Each of the above-referenced patent applications is being filed concurrently herewith and is assigned to the assignee of this invention. The teachings of all of these patent applications are incorporated herein by reference.

FIELD OF THE INVENTION

The present invention relates, in general, to railway locomotive type throttle controllers and, more particularly, this invention relates to a method of performing diagnostic testing of an electronically controlled railway locomotive throttle controller in addition to providing a capability for taking an appropriate corrective action when such corrective action is so indicated by the performance of such diagnostic testing.

BACKGROUND OF THE INVENTION

Prior to the present invention, as is generally well recognized in the railway industry, the throttle controller assemblies which are used in a railway type locomotive are mechanical type throttle controllers. These mechanical type throttle controller assemblies normally utilize a number of mechanical devices in order to accomplish actuation of the necessary microswitches and/or contacts. It is further well known, for example, that cams are used extensively in this application in order to accomplish the required actuation of the various microswitches and/or contacts which are present in the mechanical type throttle controller. Furthermore, it is rather difficult to perform any type of diagnostic tests on these mechanical throttle controllers and such tests which can be performed are accomplished in a more or less manual manner by the operator of such locomotive.

In addition, the mechanical type throttle controllers, presently in use on railway locomotives, have a number of other relatively serious drawbacks and/or limitations. As would be expected, these limitations have become more pronounced as the length of freight trains has grown in modern railroading. One of the primary reasons for this is because the use of more and more locomotives are required in a train consist in order to pull and/or push the added loads being hauled. For example, these mechanical type throttle controllers utilize either microswitches or contacts to control the voltage that is being applied to the trainline. Furthermore, there is no provision in these prior art mechanical throttle controllers for a possible shut down of the system in the event of an output over current.

Additionally, these mechanical type throttle controllers are not equipped to provide the operator of the locomotive with any important feedback information and, consequently, they may not recognize a potential failure situation so that some type of corrective action could be taken. Throttle controllers of the mechanical type also utilize either a resistive type voltage divider or a high power potentiometer in order to control the voltage output and they are not equipped for shutdown or voltage regulation.

The prior art mechanical throttle controllers provide labels over the mechanical handles to convey only the position of the handle to the locomotive operator. However, these mechanical throttle controllers are not equipped to display certain other relevant information such as various diagnostic information, status information and/or warning type messages.

Furthermore, in a situation where it is either desirable or necessary to provide the required throttle control from a remote host over the communication lines, the currently used mechanical type throttle controllers require that a number of additional relays be used.

It can be seen from the above discussion of the mechanical type throttle controller assemblies presently used in the railroad industry that there is an unfilled need which exists in the railroad industry for an improved railway locomotive type throttle controller assembly which will provide both enhanced performance capability, additional functions which are not possible to accomplish with the prior art mechanical type throttle controllers and more consistent reliability.

With the development of the improved electronically controlled railway locomotive throttle controller, for which a patent application is being filed concurrent herewith, as discussed above a need exists for a method of performing reliable diagnostic testing of such improved electronically controlled throttle controller.

SUMMARY OF THE INVENTION

The present invention provides a method of performing critical diagnostic testing and, when necessary, taking appropriate corrective action on an electronically controlled throttle controller which is disposed on a railway locomotive. This method includes the steps of starting a diagnostic testing program by scanning inputs from at least one of the throttle handles disposed on an electronically controlled throttle controller and a remote host. Thereafter, communicating information obtained by scanning such inputs from such at least one of such throttle handles and such remote host to at least one preselected diagnostic testing means. Then, performing a diagnostic check of such information fed to such at least one preselected diagnostic testing means. Determining at least one of that the system is functioning in a proper manner and/or that some type of corrective action is required from such diagnostic check performed in the diagnostic testing means. Taking whatever appropriate corrective action is indicated when the diagnostic testing means determines that some form of corrective action is required. Calculating the trainline outputs to be used when at least one of such corrective action to be taken is completed or it has been determined by such diagnostic testing means that such system is functioning properly. Thereafter, communicating such trainline outputs calculated to such trainline. Communicating a feedback of such trainline outputs which are being communicated to such trainline to such at least one preselected diagnostic testing means. Reading such feedback of such trainline outputs being communicated to the diagnostic testing means. Then, performing a trainline output diagnostic check on such trainline outputs being read of actual trainline output versus a commanded trainline output in order to determine at least one of that the actual trainline output is substantially correct and/or that some form of corrective action is required from such diagnostic check being performed. Taking whatever appropriate corrective action may be indicated when it is determined in the diagnostic testing means that some type of corrective action is required and, thereafter, returning to the beginning when it is determined in such diagnostic testing means that such trainline output is substantially correct.

OBJECTS OF THE INVENTION

It is, therefore, one of the primary objects of the present invention to provide a method of performing both diagnostic testing and taking appropriate corrective action, when corrective action is indicated by such diagnostic testing, on an electronically controlled throttle controller which will provide substantially enhanced reliability.

Another object of the present invention is to provide a method of performing both diagnostic testing and taking appropriate corrective action on an electronically controlled throttle controller which will alert the operator of the locomotive when some type of a corrective action is indicated by such diagnostic testing.

Still another object of the present invention is to provide a method of performing both diagnostic testing and taking appropriate corrective action on an electronically controlled throttle controller which provides a capability of storing certain preselected types of important information for later retrieval from the diagnostic testing means.

Yet another object of the present invention is to provide a method of performing both diagnostic testing and taking appropriate corrective action on an electronically controlled throttle controller which is relatively easy to implement.

A further object of the present invention is to provide a method of performing both diagnostic testing and taking appropriate corrective action on an electronically controlled throttle controller which has incorporated therein the capability of performing internal diagnostics.

An additional object of the present invention is to provide a method of performing both diagnostic testing and taking appropriate corrective action on an electronically controlled throttle controller which may have predetermined signal stabilization times incorporated therein.

In addition to the various objects and advantages of the present invention discussed above, various additional objects and advantages of the method of performing both diagnostic testing and taking appropriate corrective action on an electronically controlled throttle controller will become more readily apparent to those persons who are skilled in the railway electronic art from the following more detailed description of the invention, particularly, when such detailed description is taken in conjunction with the attached drawing figure and with the appended claims.

Figure 1A:
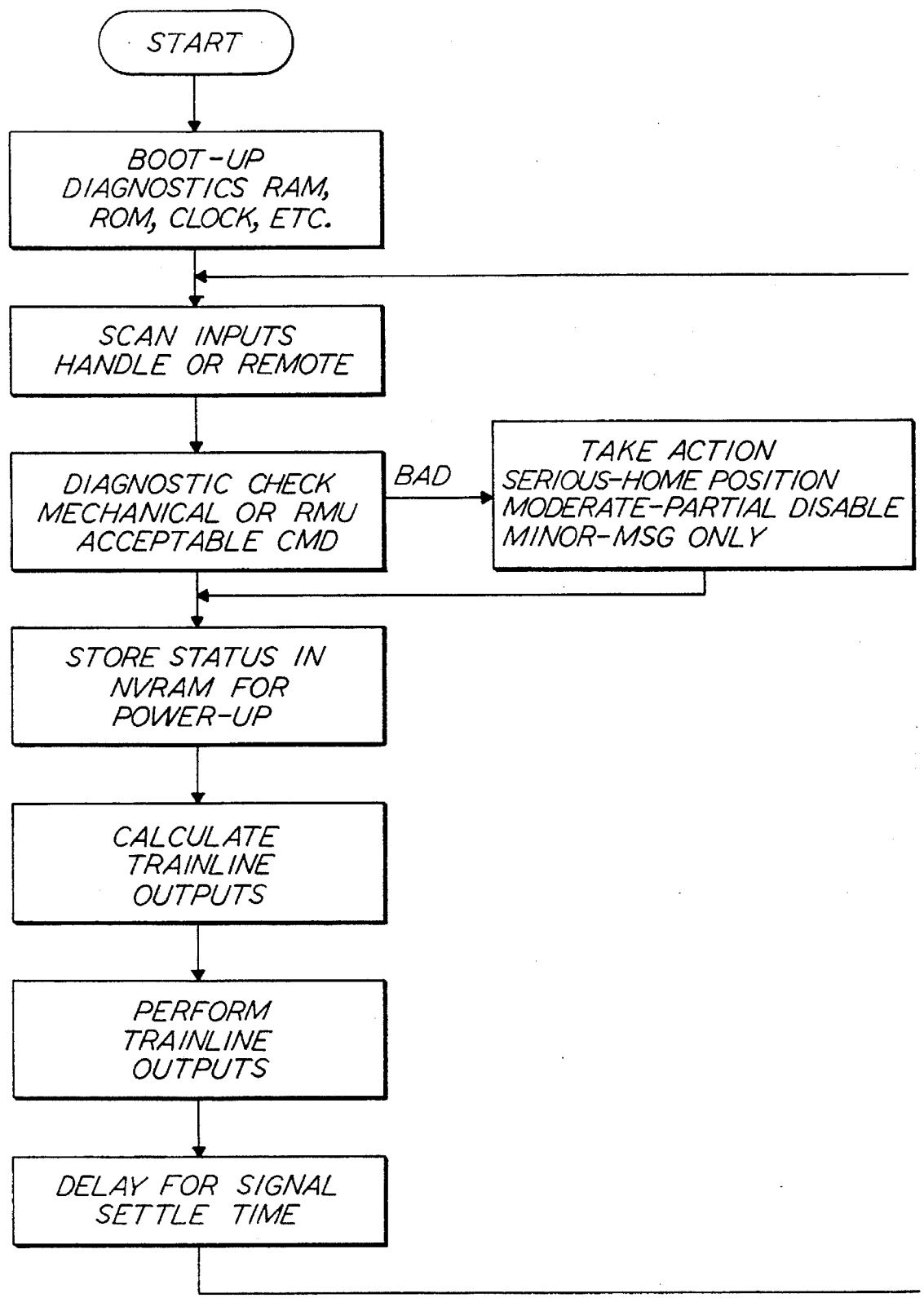
FIGS. 1A and 1B show a schematic block diagram of the presently preferred sequence of steps to be taken in order to achieve the benefits of the method of the invention.
Figure 1B:
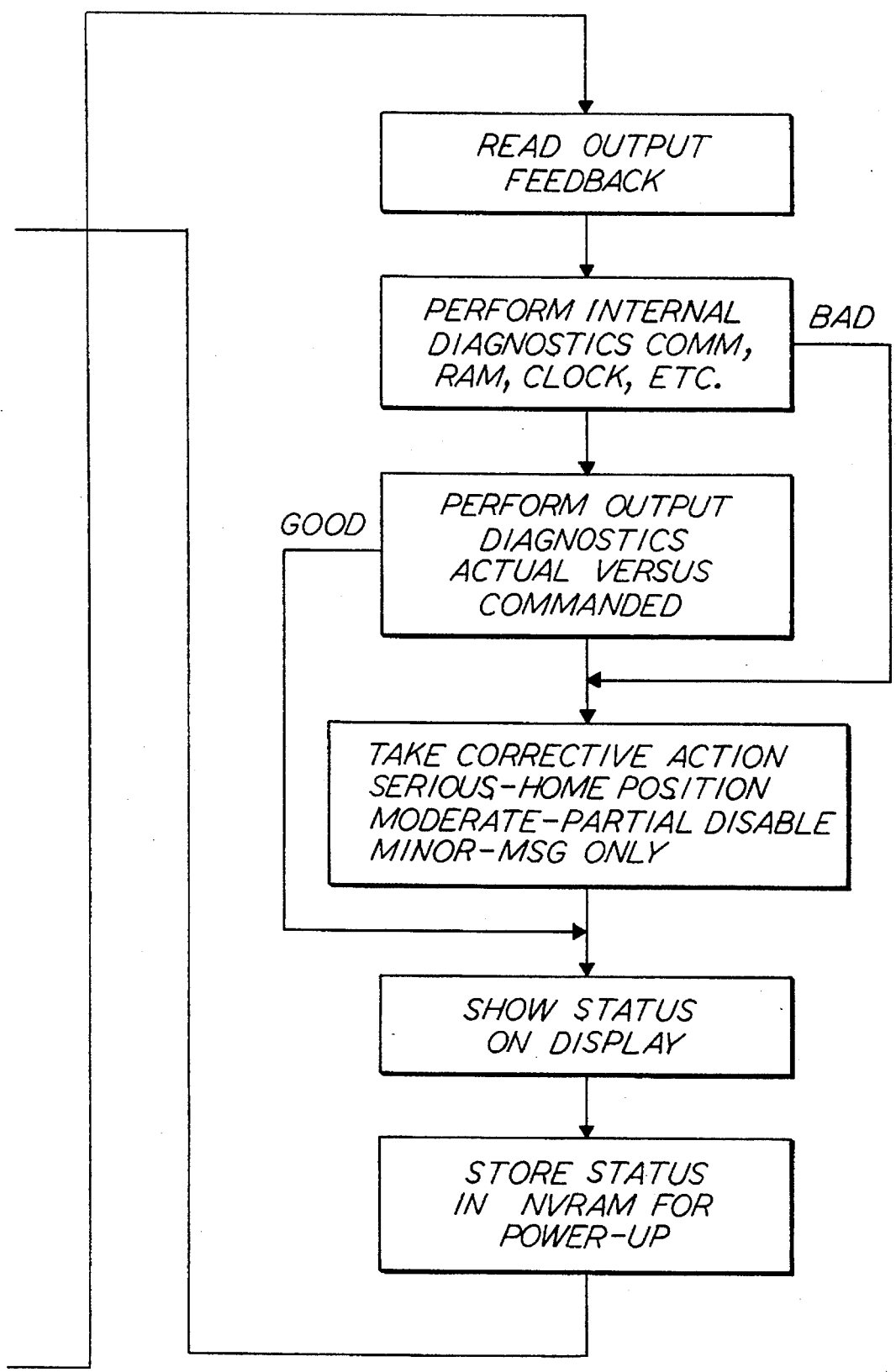

BRIEF DESCRIPTION OF THE PRESENTLY PREFERRED AND ALTERNATIVE EMBODIMENTS OF THE INVENTION

For a clearer understanding of the invention, reference is now made, more particularly, to the attached drawing Figure in which there is illustrated both the presently preferred and a number of alternative embodiments of the instant invention.

As has been illustrated therein, the invented method of performing diagnostic testing and taking any necessary corrective action on an electronically controlled throttle controller (not shown) disposed on a railway locomotive (not shown) includes the steps of scanning a predetermined number of inputs from at least one of throttle handles on the throttle controller and a remote host. The information obtained by scanning such inputs from such at least one of such throttle handles and such remote host is then communicated to an at least one preselected diagnostic testing means.

It should be noted here that the information obtained by scanning the throttle handles is their particular operating position at the moment in time when such throttle handles are scanned.

A diagnostic check of such information that has been communicated to such at least one preselected diagnostic testing means is then performed. Such diagnostic check enables a determination to be made that at least one of the system is functioning properly and/or that some corrective action is required. Thereafter, taking whatever corrective action is indicated when it is determined that such corrective action is required.

It is to be understood that such corrective action may be considered to range from a relative minor problem to a rather serious problem. Such range will generally depend upon a number of different factors. For example, these factors can vary depending upon the particular railroad; the terrain over which the train consist will be required to operate and possibly even the weather conditions that may be encountered.

Nevertheless, as used herein a serious corrective action to be taken is one which requires centering the throttle handles into known positions. These known positions are throttle handle (TH)=idle; dynamic brake (DB)=off and reverser (REV)=neutral. A minor corrective action as used in this specification is one which may only require that a message be displayed to the operator of the locomotive.

The trainline outputs to be used can be calculated when such at least one of such appropriate corrective action to be taken has been completed and/or it has been determined that such system is functioning in a proper manner. The calculated trainline outputs are then communicated to such trainline.

A next step in the method, according to the present invention, involves communicating a feedback of such trainline outputs being communicated to the trainline to such at least one preselected diagnostic testing means. Thereafter, reading such feedback of the trainline outputs being communicated to the trainline and performing a trainline output diagnostic check, on such trainline outputs read, of the actual trainline output versus the trainline output which had been commanded.

From the diagnostic check made it can then be determined that at least one of the actual trainline output is substantially correct and/or that some type of corrective action is required before proceeding. Thereafter, taking whatever corrective action may be indicated when it is determined that some corrective action is required.

The final essential step, according to the method of the present invention, is returning to the beginning of the test when it is determined that such trainline output is substantially correct.

In a generally more preferred embodiment of the invention, such method of performing both diagnostic testing and taking any required corrective action on an electronically controlled throttle controller will include the additional step of performing boot-up diagnostics on such at least one preselected diagnostic testing means. Such boot-up diagnostics include at least one of checking the random access memory (RAM), the read only memory (ROM) and the clock disposed in such at least one preselected diagnostic testing means.

Additionally, in this more preferred embodiment, such method will include the additional step of performing an internal diagnostic check on such at least one preselected diagnostic testing means reading such feedback of the trainline outputs being communicated to such trainline. Such internal diagnostic check includes at least one of checking the commands issued, the RAM and the clock.

The method of performing both diagnostic testing and taking corrective action on an electronically controlled throttle controller, in the more preferred embodiment thereof, further includes the additional step of displaying preselected important information on a display means to an operator of such locomotive before returning to the beginning of the test program. Preferably, such display of such preselected information will be achieved by way of a visual display device such as, for example, a liquid crystal display.

Additionally, in the presently preferred embodiment of the invention, such method of performing both the diagnostic testing and taking appropriate corrective action on an electronically controlled throttle controller includes the additional step of storing certain preselected important information in a preselected memory storage device for power-up calculating the trainline outputs.

Such method, in this presently preferred embodiment of the invention, further includes the additional step of providing for a delay for a predetermined period of time in order to achieve a trainline output signal stabilization.

It is, likewise, presently preferred that such method of performing both such diagnostic testing and taking an appropriate corrective action on an electronically controlled throttle controller for use on a railway locomotive will include the additional step of storing certain preselected important information in a preselected memory storage device for power-up prior to returning to the beginning. It is also presently preferred that provision be made for periodically retrieving such preselected important information which has been stored in the preselected memory storage device for power-up.

While both a presently preferred and a number of alternative embodiments of the method of performing both diagnostic testing and taking an appropriate corrective action when indicated by such diagnostic testing on an electronically controlled throttle controller have been described in detail above, it should be understood that various additional adaptations and/or modifications may be envisioned by those persons who are skilled in the railway electronics art without departing from the spirit or scope of the appended claims.

We claim:

1. A method of performing both diagnostic testing and taking appropriate corrective action on an electronically controlled throttle controller disposed on a railway locomotive, said method comprising the steps of:

(a) scanning inputs from at least one of throttle handles disposed on such throttle controller and a remote host;

(b) communicating information obtained in step (a) from said at least one of said throttle handles and said remote host to at least one preselected diagnostic testing means;

(c) performing a diagnostic check of said information fed to said at least one preselected diagnostic testing means;

(d) determining at least one of whether such electronically controlled throttle controller system is functioning properly and whether appropriate corrective action is required from said diagnostic check performed in step (c);

(e) taking whatever appropriate corrective action is indicated when it is determined in step (d) that said corrective action is required;

(f) calculating trainline outputs to be used when at least one of said appropriate corrective action taken in step (e) is completed and it has been determined in step (d) that said electronically controlled throttle controller system is functioning properly;

(g) communicating said trainline outputs calculated in step (f) to said trainline;

(h) communicating a feedback of said trainline outputs being communicated in step (g) to said at least one preselected diagnostic testing means;

(i) reading said feedback of said trainline outputs being communicated in step (h);

(j) performing a trainline output diagnostic check on said trainline outputs read in step (i) of actual trainline output versus a commanded trainline output;

(k) determining at least one of whether actual trainline output is substantially correct and whether appropriate corrective action is required from said diagnostic check performed in step (j);

(l) taking said appropriate corrective action indicated when it is determined in step (k) that said appropriate corrective action in required; and (m) returning to step (a) when it is determined in step (k) that said trainline output is substantially correct.

2. A method of performing both diagnostic testing and taking appropriate corrective action on an electronically controlled throttle controller, according to claim 1, wherein said method includes the additional step of performing boot-up diagnostics on said at least one preselected diagnostic testing means, prior to step (a).

3. A method of performing both diagnostic testing and taking appropriate corrective action on an electronically controlled throttle controller, according to claim 1, wherein said method includes the additional step of, after step (i), performing an internal diagnostic check on said at least one preselected diagnostic testing means.

4. A method of performing both diagnostic testing and taking appropriate corrective action on an electronically controlled throttle controller, according to claim 1, wherein said method includes the additional step of, prior to step (m), displaying certain preselected important information on a display means to an operator of such locomotive.

5. A method of performing both diagnostic testing and taking appropriate corrective action on an electronically controlled throttle controller, according to claim 1, wherein said method includes the additional step of, before step (f), storing preselected important information in a preselected memory storage device for power-up.

6. A method of performing both diagnostic testing and taking appropriate corrective action on an electronically controlled throttle controller, according to claim 1, wherein said method includes the additional step of, before step (i), delaying for a predetermined length of signal stabilization time.

7. A method of performing both diagnostic testing and taking appropriate corrective action on an electronically controlled throttle controller, according to claim 1, wherein said method includes the additional step of, prior to step (m), storing certain preselected important information in a preselected memory storage device for power-up.

8. A method of performing both diagnostic testing and taking appropriate corrective action on an electronically controlled throttle controller, according to claim 1, wherein said inputs scanned in step (a) are said throttle handles position disposed on such electronically controlled throttle controller.

9. A method of performing both diagnostic testing and taking appropriate corrective action on an electronically controlled throttle controller, according to claim 1, wherein said appropriate corrective action to be taken in step (e) may include addressing a serious problem.

10. A method of performing both diagnostic testing and taking appropriate corrective action on an electronically controlled throttle controller, according to claim 9, wherein said appropriate corrective action to be taken in step (1) may include addressing a serious problem.

11. A method of performing diagnostic both testing and taking appropriate corrective action on an electronically controlled throttle controller, according to claim 1, wherein said inputs scanned in step (a) are from said remote host.

12. A method of performing both diagnostic testing and taking appropriate corrective action on an electronically controlled throttle controller, according to claim 2, wherein said boot-up diagnostics include at least one of checking random access memory (RAM), read only memory (ROM) and clock disposed in said at least one preselected diagnostic testing means.

13. A method of performing both diagnostic testing and taking appropriate corrective action on an electronically controlled throttle controller, according to claim 3, wherein said internal diagnostic check includes at least one of checking commands, RAM and clock.

14. A method of performing both diagnostic testing and taking appropriate corrective action on an electronically controlled throttle controller, according to claim 4, wherein said displaying of said certain preselected important information on a display means to an operator of such locomotive is a visual display.

15. A method of performing both diagnostic testing and taking appropriate corrective action on an electronically controlled throttle controller, according to claim 5, wherein said method includes the additional step of retrieving said certain preselected important information stored in said preselected memory storage device for power-up.

16. A method of performing both diagnostic testing and taking appropriate corrective action on an electronically controlled throttle controller, according to claim 7, wherein said method includes the additional step of retrieving said certain preselected important information stored in said preselected memory storage device for power-up.

17. A method of performing both diagnostic testing and taking appropriate corrective action on an electronically controlled throttle controller, according to claim 9, wherein said method includes the additional step of centering said throttle handles disposed on such throttle controller in known handle positions when said appropriate corrective action to be taken is considered to be serious.

18. A method of performing both diagnostic testing and taking appropriate corrective action on an electronically controlled throttle controller, according to claim 10, wherein said method includes the additional step of centering said throttle handles disposed on such throttle controller in known handle positions when said appropriate corrective action to be taken is considered to be serious.

19. A method of performing both diagnostic testing and taking appropriate corrective action on an electronically controlled throttle controller, according to claim 9, wherein said method includes the additional step of displaying a message to an operator of such locomotive when said appropriate corrective action to be taken is considered to be relatively minor.

20. A method of performing both diagnostic testing and taking appropriate corrective action on an electronically controlled throttle controller, according to claim 10, wherein said method includes the additional step of displaying a message to an operator of such locomotive when said appropriate corrective action to be taken is considered to be relatively minor.

* * * * *

UNITED STATES PATENT AND TRADEMARK OFFICE
CERTIFICATE OF CORRECTION

PATENT NO. : 5,563,785
DATED : October 8, 1996
INVENTOR(S) : Daniel J. Wolf, et al.

It is certified that error appears in the above-identified patent and that said Letters Patent is hereby corrected as shown below:

Column 6, line 53, please delete "in" and insert --is--.

Column 7, line 41, please delete "diagnostic both" and insert --both diagnostic--.

Signed and Sealed this

Thirtieth Day of June, 1998

Attest:

BRUCE LEHMAN

Attesting Officer  Commissioner of Patents and Trademarks